June 10, 1969 S. C. COGAR 3,449,735

TRANSDUCER POSITIONING SYSTEM

Filed Dec. 30, 1965 Sheet 1 of 2

INVENTOR
SAMUEL C. COGAR

BY Edward M. Farrell

ATTORNEY 3,449,735
Patented June 10, 1969

3,449,735

TRANSDUCER POSITIONING SYSTEM

Samuel C. Cogar, Norristown, Pa., assignor to Sperry Rand Corporation, New York, N.Y., a corporation of Delaware Filed Dec. 30, 1965, Ser. No. 517,674
Int. Cl. G11b *5/00*
U.S. Cl. 340—174.1 1 Claim

ABSTRACT OF THE DISCLOSURE

The present system provides first and second input circuits for respectively entering into first and second counters information indicating the position of a read head and the position to which the read head should be moved. The information from the two counters is compared and there is provided one of two output signals from the comparator. One of the output signals indicates that the first counter value is less than the value in the second counter while the second output indicates that the first counter value is greater than value in the second counter. A "less than" signal is transmitted through circuitry to the stepping motor to effect a current flow of one polarity while a "greater than" signal is transmitted to the stepping motor to provide a current of polarity in the other direction. In this way the stepping motor moves the read heads in a forward direction or a reverse direction.

This invention relates to positioning systems, and more particularly to positioning systems for moving a transducer element to a selected track on a record medium.

In computer systems, mass storage memory devices, such as magnetic drums or discs, are used to store bits of information. In general, these bits of information are stored on a plurality of tracks. A transducer element is selectively moved to selected areas on the record medium to perform a reading or writing operation. The recording on the record medum may be formed by magnetizing certain areas on the surface of the medium.

If there is a large amount of information stored on a record medium and it is desired to read out the information quickly, means must be employed to move the transducer element quickly to the desired track. Once the transducer element is disposed over a desired track, the coded recorded information on the track will permit certain portions of the track, called sectors, to be read.

While various servomechanisms have been used in the past to move transducer elements to selected areas of a record medium, they have generally been relatively expensve and not suitable for small inexpensive random access systems. In such small inexpensive random access systems, it is desirable to achieve positioning of a transducer element to selected records on a record medium relatively cheap without too much sacrifice in speed.

In accordance with the present invention, a positioning system for positioning a transducer to a selected track on a record medium is provided. A source of signals representative of the position of the track to be selected is compared with a second source of signals representative of the actual position of the transducer. A comparator circuit is employed to detect the difference in the signals from the two sources. Output signals are developed when there is a difference between the two signals to step a stepping motor to drive the transducer element in steps until it reaches the desired selected track. Each time the stepping motor is stepped, one counter storing the information relating to the position of the transducer is also stepped so as to decrease the difference in the signals between the two counters untl a zero condition is reached signifying an "on track" condition.

Figure 1:
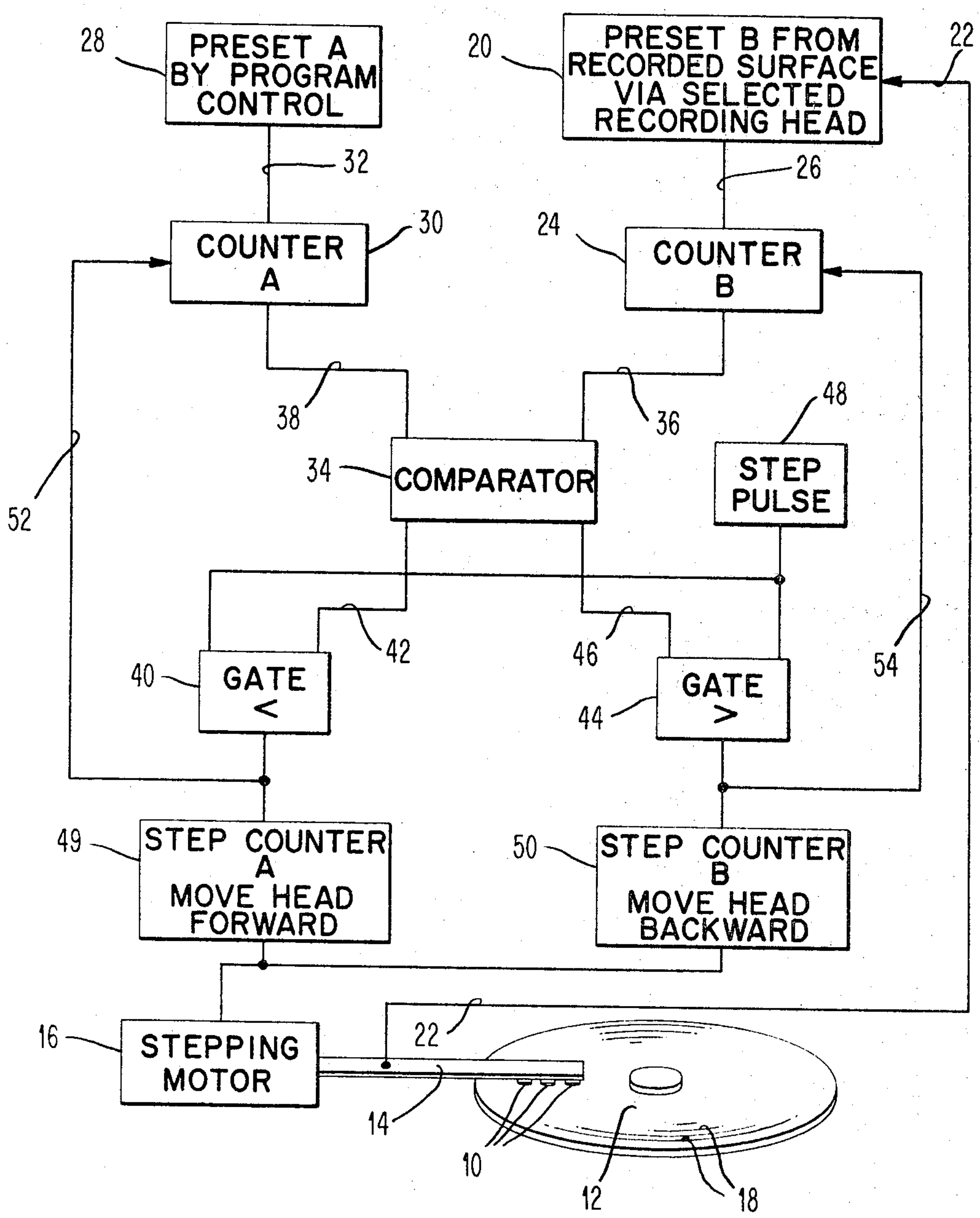
Figure 2:
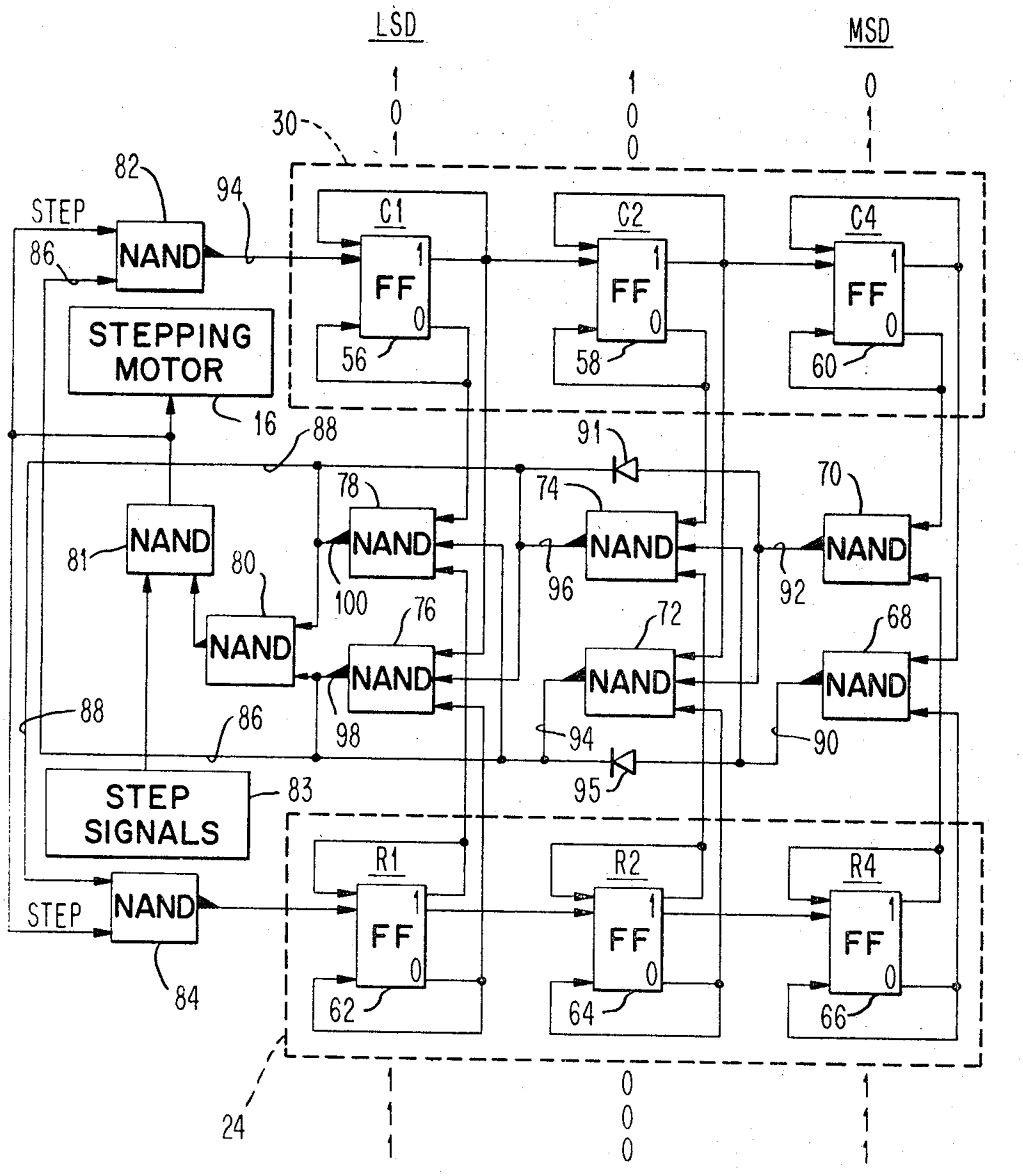

Various modifications and advantages of the present invention will be apparent and suggest themselves to those skilled in the art, from a reading of the following specification and claim, in conjunction wtih the accompanying drawing, in which:

FIGURE 1 is a block diagram illustrating a positioning system, in accordance witth the present invention, and FIGURE 2 is a block diagram illustrating the comparator circuit of FIGURE 1, in accordance with the present invention.

Referring particularly to FIGURE 1, a plurality of transducers 10 is disposed to be moved over a record medium, such as the disc 12. The transducers 10 are suitably connected to an arm 14 which is adapted to be moved in steps by a stepping motor 16.

In general, the transducers 10 are moved to selected tracks 18 to perform a reading or writing operation. The various reading and writing circuits which may be associated with the transducers are not disclosed since they are not related to the present invention. The actual position of the transducer element 10 may be detected by various well-known means, such as reading information from a track which represents the track number, and be represented by a binary number. This binary number may be stored in a storage device 20 with the information being transmitted through a lead 22. The actual position of the transducer elements may be in the form of eight binary digits, for example. These binary digits may represent one hundred or more different positions. The actual number of positions represented will be dependent upon the number of information tracks on the record medium. The information from the storage device 20 is applied to a counter 24 through a lead 26. Thus, it may be seen that the binary bits stored in the counter 24 represents the actual position of the transducers 10.

When it is desired to move the transducer 10 from one position to another, it is first necessary to know the position or address to which the transducers 10 are to be moved. This selected position may also be represented by a number of binary digits. These binary digits may be obtained from the overall computer control system, or from an index track on the disc 12, and applied to a storage element 28. The binary bits of information from the storage element 28 is applied to a second counter 30 through a lead 32. Thus, if the transducers 10 are in a position different than the one selected, the binary bits of information stored in the counters 24 and 30 will be different.

Output signals from the counters 24 and 30 are applied to a comparator 34 through leads 36 and 38, respectively. The comparator circuit 34 detects a difference in the stored signal between the counters 24 and 30. If the information stored in the counter 30 is less than the information stored in the counter 24, an output signal from the comparator 34 is applied to a gate circuit 40 through a lead 42. On the other hand, if the information in the counter 30 is greater than the information stored in the counter 24 a signal from the comparator 34 will be applied to a gate circuit 44 through a lead 46. The information stored in the counter 30 with respect to the information stored in the counter 24 will determine the direction in which the transducer 10 must be moved.

Whenever there is a difference between the information stored in the counters 24 and 30, a step pulse will be developed in a step pulse circuit 48, as will be seen. Output signals will be developed by one of the gate circuits 40 or 44 dependent upon whether the information stored in the counter 30 is greater or less than the information stored in the counter 24. The stepping pulses develop output signals at one of the gates 40 or 44. Output pulses from the gate 40 are applied to a step counter circuit 49 which designates that the transducers 10 are to be moved in a forward direction. Output pulses from the circuit 49 are applied to the stepping motor 16, which in turn causes the arm 14 to be moved one step, which could represent one information track.

Output signals from the gate 44 is applied to a step counter circuit 50 which indicates that the transducers 10 are to be moved in a backward direction. Output signals from the circuit 50 are applied to the stepping motor 16 which in turn steps the arm 14 in a backward direction. The stepping motor 16 as indicated may, of course, comprise two stepping motors designed to operate in two different directions.

In addition to providing stepping pulses for stepping the motor in one of two directions, the output pulse signals from the gates 40 and 44 are also applied back to their counters 30 and 24 through leads 52 and 54, respectively.

The pulse signals fed back to the counters 24 and 30 step the counters one digit. The counters are stepped progressively until the information stored in both of the counters 24 and 30 are equal. At this point, the transducers 10 are disposed over the selected tracks of the disc 12. In a preferred embodiment, the count is always up so that the counter storing the lower informtion is the one which is stepped.

FIGURE 2 illustrates the comparator circut 34. As mentioned, the counters 24 and 30 may store as many as eight binary bits, more or less dependent upon the number of information tracks on the disc. Since the operation of the circuit will be the same regardless of the number of bits employed, only three bits of stored information will be considered for purposes of clarity.

In describing the counters in FIGURE 2, conventional flip-flop circuits are employed. In addition, NAND gate circuits are employed. One form of NAND gate may be a device in which all input signals must be low to produce a high output signal .

For purposes of explanation, assume that the selected track is designated by the binary signals "110." These binary digits are stored in the counter 30, with the least significant digit "1" being stored in the flip-flop 56, the second digit "1" being stored in the flip-flop 58, and the most significant or third digit "0" being stored in the flip-flop 60. With this information stored in the counter 30, the "1" output of the flip-flop 56 is low, the "1" output of the flip-flop 58 is low, and the "1" output of the flip-flop 60 is high.

Assume that the counter 24 is storing binary bits "101." These bits represent the actual position of the transducers 10. Under these conditions, the "1" output of the flip-flop 62 is low, the "0" output of the flip-flop 64 is low, and the "1" output of the flip-flop 66 is low. As is well known in conventional flip-flops, when the "1" state is high, the "0" state is low, and vice-versa.

The information stored in the counter 30 represeting "110" also represents the decimal number 3. The binary number "101" represents the decimal number 5. Thus it can be said that the transducers 10 are positioned at track 5 and it is desired to move the transducers to track 3. This means that the stepping motor 16 must be stepped twice.

The comparator circuit will compare each bit of information in the counters 24 and 30, starting with the most significant digit and working down towards the least significant digit. The comparator will produce a stepping pulse until the inforamtion signals stored in the two counters are equal.

The "1" output of the flip-flop 60 is applied to the NAND gate 68. The "0" output from the flip-flop 60 is connected to the NAND gate 70. In like manner, the "1" output of the flip-flop 66 is connected to the NAND gate 70 and the "0" output of the flip-flop 66 is connected to the NAND gate 68.

In a similar manner, the flip-flop 58 has its "1" output connected to a NAND gate 72 and its "0" state connected to a NAND gate 74. The flip-flop 64 has its "1" output connected to the NAND gate 74 and its "0" state connected to the NAND gate 72. At the least significant digit positioned in the counter, the flip-flop 56 has its "1" output connected to a NAND gate 76 and its "0" output connected to NAND gate 78. The flip-flop 62 has its "1" output connected to the NAND gate 78 and its "0" output connected to the NAND gate 76. The output signal from the NAND gates 76 and 78 are applied to a NAND gate 80. The output signals from the NAND gate 80 is applied to a NAND gate 81. Stepping signals are also applied to the NAND gate 81 from a signal source 83. With the output signal from the NAND gate 80 low, the NAND gate 81 will generate step signals which are applied to step the stepping motor 16 as well as step one of the counters 24 or 30.

Stepping signals are applied from the signal source 83 through the NAND gate 81 to NAND gates 82 and 84 which become operative when signals are received from leads 86 or 88, as will be seen.

If the flip-flop 60 has its "0" output low and the flip-flop 66 has its "1" output low, the NAND gate 70 produces a high output signal on the lead 92. Under these conditons, the NAND gate 68 will produce a low output signal at its output lead 90 since the "1" output of the flip-flop 60 is high, in addition to the output from the "0" output of the flip-flop 66 also being high.

When a high output signal is developed at the lead 92 it is applied to the NAND gate 84 through diode 91 and the lead 88. This output signal is also applied to the NAND gate 80 and used to control the step of the stepping motor 16. The NAND gate 68 develops a low output signal at the lead 90 through a diode 95 to the NAND gate 82 allowing counter 30 to step in a well known manner by triggering the flip-flop 56. When the counter 30 is stepped the information stored will not be "110" but will step to store bits "001." The information in the counter 24 will remain at "101."

At this point, both "1" states of the flip-flops 60 and 66 are low and both "0" states are high. Therefore, low output signals will be developed at the leads 90 and 92 from the NAND gate 68 or 70. The counter is now ready to compare the second most significant digit.

It is noted that when no change in output signals are developed at the leads 90 and 92, the signal level at these leads are low. The low level signal from the lead 90 is applied to the NAND gate 74 and the low level signal from the lead 92 is applied to the NAND gate 72. An operation which compares the second stored digits now takes place.

At this point, the "0" outputs of both the flip-flop 58 and 64 are low and the two "1" outputs are high. Under these conditions, neither of the NAND gates 72 or 74 will produce high output signals at leads 94 or 96. The low signal levels from the leads 94 and 96 are applied to the NAND gate circuits 76 and 78. Since the most significant digits and the second most significant digits are now the same in the two counters, the least significant digits in the counters must now be compared.

The flip-flop 56 has its "0" state low and its "1" state high whereas the flip-flop 62 has its "1" state low and its "0" state high. Under these conditions, all the input signal levels to the NAND gate 78 are low and a high output signal will be developed at lead 100. The high output signal from the lead 100 is applied to the NAND gate 84 through the lead 88 to inhibit any signal to step the counter 84. A low level signal from the NAND gate 76 applied through the lead 86 to the input of NAND gate 82 develops a signal at the lead 94 to step the counter 30 in a well known manner.

Because the output level at the NAND gate 80 is low a step signal is applied from the NAND gate 81 to step the stepping motor 16.

After the counter 30 has stepped, it will store the digits "101." It is noted that now the bits stored in the counter 30 are the same as the bits stored in the counter 24. Under these conditions, none of the NAND gates 70, 74, 78, 68, 72 or 76 develop a high output signal. However, the NAND gates 78 develops a low level signal at the lead 100 and the NAND gate 76 has a low level signal at the lead 98 with the two low level signals being applied to the NAND gate 80. A high output signal from the NAND gate 80 indicates that the digit stored in both of the counters 24 and 30 are equal. The transducers 10 are now on the selected track. The high output signal from the NAND gate 80 prevents step signals from the source 83 from passing through the NAND gate 81 to step either the motor 16 or the counters 24 or 30.

It is noted that the counter 30 was stepped twice until its stored information was equal to the stored information of the counter 24. At the same time, the stepping motor was stepped two steps representing two information tracks on the disc 12.

Of course, the counters described and the distance moved by the transducers have been greatly simplified for purposes of explanation. It is recognized that hundreds of information tracks on a recording medium may actually be involved and that far move complex counter circuits would normally be used in most computer systems. Also, the counters could have been counted down or decremented rather than incremented or counted up.

It is also realized that the counter 24 may be the one which is stepped with the NAND gate 84 producing the appropriate signals. A condition in which the counter 30 stored the lower information has been described. If the counter 24 stored the lower information, the basic operation of the devices described would be basically the same except that the counter 24 will step and the stepping motor 16 would step in the opposite direction.

The number of transducers to be moved has been illustrated as three. However, this number is merely illustrative, with the number of transducers being a function of the distance and speed through which the transducers must operate.

The stepping in discrete steps as described makes it possible to produce a relatively simple and inexpensive positioning system without the problems normally found in analog servosystems.

The embodiments of the invention in which an exclusive property or privilege is claimed are defined as follows:

1. A positioning system for positioning a magnetic recording transducer to a selected track on a record medium comprising first entering means to enter information which indicates the position that the transducer should be located at, second entering means to read information from a recording surface to indicate the position that the transducer is located at, first counter means connected to said first entering means, second counter means connected to said second entering means, comparator means to receive information from said first and second counter means and make a comparison thereof and having first and second output signal means therefrom, a signal on said first output signal means indicates that the value of the information in said first counter means is greater than the value of the information in said second counter means and alternatively a signal in said second output signal means indicates that the value of the information in said first counter means is less than the value of the information in said second counter means, first gating means connecting said first output means from said comparator means to pass said less than signal therethrough to first circuitry means, second gating means connected to said second output means from said comparator means to pass the greater than signal therethrough to second circuitry means, stepping motor means connected to said transducer and connected to said first and second circuitry means to respond to the current signal from said first circuitry means in such a fashion as to drive said transducer in a forward direction and to respond to the current signal from said second circuitry means to drive said transducer in a reverse direction.

References Cited

UNITED STATES PATENTS 2,733,425 1/1956 Williams et al. ------ 340—174.1

OTHER REFERENCES

T. Noyes and W. E. Dickinson: "Engineering Design of a Magnetic-Disc, Random Access Memory," IBM Technical Publication, 1957, pp. 3–5 and FIGS. 3 and 4.

BERNARD KONICK, *Primary Examiner.*

VINCENT P. CANNEY, *Assistant Examiner.*